United States Patent
Grube et al.

(10) Patent No.: US 6,583,202 B1
(45) Date of Patent: Jun. 24, 2003

(54) ROOFING MEMBRANE

(75) Inventors: Louis Lynn Grube, Bound Brook, NJ (US); George Manuel Adao, Union, NJ (US); Krishna Venkataswamy, Sparta, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 0 days.

(21) Appl. No.: 09/950,976

(22) Filed: Sep. 13, 2001

(51) Int. Cl.[7] .................. C08L 95/00; D06N 5/00; B32B 27/32
(52) U.S. Cl. .................. 524/68; 524/59; 524/70; 524/71; 427/136; 427/138; 428/141; 428/143; 428/144; 428/147; 428/149; 428/150; 428/489
(58) Field of Search ................. 524/59, 68, 70, 524/71; 427/136, 138; 428/141, 143, 144, 147, 149, 150, 489

(56) References Cited

U.S. PATENT DOCUMENTS

| | | | | |
|---|---|---|---|---|
| 4,368,228 A | * | 1/1983 | Gorgati | 428/110 |
| 4,584,210 A | * | 4/1986 | Previsani | 427/204 |
| 5,100,715 A | * | 3/1992 | Zimmerman et al. | 428/147 |
| 5,744,524 A | * | 4/1998 | Manandhar et al. | 524/70 |
| 6,134,856 A | * | 10/2000 | Khan et al. | 52/536 |
| 6,207,593 B1 | * | 3/2001 | Fields | 442/86 |

\* cited by examiner

*Primary Examiner*—Peter Szekely
(74) *Attorney, Agent, or Firm*—Marilyn J. Maue; William J. Davis; Walter Katz

(57) ABSTRACT

This invention relates to a roofing or siding membrane comprising a non-woven mat coated with an asphaltic composition containing, in addition to 35–75 wt. % bitumen, a mixture of isotactic and amorphous propylene polymers and between about 0.08 and about 15 wt. % of a functionalized, olefin polymer to provide a non-staining membrane of high tensile strength, low polyolefin content with respect to asphalt, improved compatibility between asphalt and non-functionalized polymers and reduced light end asphalt and polymer exudates. The invention also relates to a method for preparing the membrane.

13 Claims, No Drawings

ROOFING MEMBRANE

FIELD OF THE INVENTION

This invention concerns a flexible asphaltic roofing membrane comprising a mat coated with an asphaltic/olefin polymer composition which composition improves asphalt/olefin polymer compatibility while minimizing the polymer to asphalt weight ratio.

BACKGROUND OF THE INVENTION

Asphaltic compositions containing propylene and/or ethylene polymers are known and used extensively in coating non-woven mat surfaces used as membranes in commercial and domestic building construction. However, attempts to overcome several objectionable characteristics associated with these coating compositions have been the subject of current research. One important disadvantage relates to the cost resulting from the relatively high concentration of polymer required to provide a good weatherability by converting the asphaltic backbone to a continuous polymeric matrix. Other objections to the current coatings reside in low compatibility between the non-polar polymer and polar asphaltic components, the staining of substrates due to undesirably high light end exudates from the asphalt and/or polymer components, their tendency to degrade upon exposure to UV light and their low degree of flexibility which often leads to fracture or peel-off of the coating.

Accordingly, it is an object of this invention to minimize or eliminate the above objections associated with roofing and siding asphaltic coatings.

Another object of the invention is to achieve a more efficient, more economical use of polymer in asphaltic coatings.

Still another object is to improve the compatibility between asphalt and polyolefins in substrate coatings.

Yet another object is to provide an economical, commercially feasible process for the manufacture of improved asphaltic coatings.

These and other objects and benefits of this invention will become apparent from the following description and disclosure.

SUMMARY OF THE INVENTION

In the following discussion, the term polymer is intended to include homo-, co- and ter-polymers unless otherwise indicated.

This invention concerns a roofing or siding membrane comprising a non-woven mat coated on at least one surface with an asphaltic composition comprising, by weight, (a) between about 35 and about 85% asphalt;

(b) between about 1 and about 15% isotactic $C_2$ to $C_3$ olefin polymer, most desirably poly(propylene), utilized in a crystalline state;

(c) between about 5 and about 50% amorphous $C_2$ to $C_3$ olefin polymer, most desirably propylene/ethylene copolymer;

(d) between about 0.08 and about 15% of a functionalized ethylene and/or propylene polymer; said composition optionally containing (e) up to 20% of a non-functionalized ethylene/$C_3$ to $C_{12}$ α-olefin copolymer and/or (f) up to 50% filler.

The invention also concerns the above novel coating composition.

DETAILED DESCRIPTION OF THE INVENTION

In accordance with the present invention there is provided a roofing or siding membrane comprising a non-woven mat, preferable a polyester mat, coated on at least one of its top and bottom surfaces with a 0.1 to 9 mm thick layer of instant asphalt/polymer composition containing components (a) through (d) and optionally (e) and/or (f). The functionalized polymer component (d) is a homo-, co- or ter-polymer of ethylene or propylene or a mixture thereof. Suitable comonomers of the functionalized ethylene and/or propylene monomers include $C_4$ to $C_{12}$ α-olefins and mixtures thereof; particularly preferred are the butene and octene comonomers. These functionalized polymers have a melt viscosity at 374° F. of from about 200 to about 300,000 cps and can be activated with a functional moiety selected from the group of:

1. an organic nitrogen-containing group such as amino or amido as in succinimide, phthalimide, etc. and
2. an organic oxygen-containing group such as, for example, hydroxy, carboxyl, anhydride, aldehyde, epoxy, peroxy and ester.

Examples of suitable polymers of component (d) include functionalized polyethylene, polypropylene and ethylene/propylene, ethylene/butene, propylene/butene, ethylene/hexene, ethylene/octene copolymers, ethylene/propylene/butene, ethylene/propylene/octene terpolymers, ethylene/propylene/$C_4$ to $C_8$ dienes and the like and mixtures thereof. The most preferred functionalized polymers are the maleic anhydride functionalized $C_2$ to $C_3$ olefin polymers. These polymers are commercially available and include the maleic anhydride functionalized poly(propylene), e.g. POLYBOND® 3000, supplied by Crompton Corporation or FUSABOND® 353 D, supplied by DuPont Chemical Co.; the maleic anhydride functionalized poly(ethylene), e.g. EPOLENE® G 3003 and G 3015 supplied by Eastman Chemical Co.; the maleic anhydride functionalized ethylene/propylene copolymer, e.g. FLEXOMER DEFA 1373, supplied by Dow Chemical Co. and the methacrylate functionalized propylene/ethylene/butene terpolymer, e.g. LOTADER®, supplied by Autofina Corp, Superior mat coating compositions containing filler are obtained with compositions containing, by weight, 45–65% (a); 3–5.5% (b); 8–20% (c); 0.1–2% (d); 1–5% (e) and 5–40% (f). Non-filled coating composition most effectively comprises, by weight, about 50–85% (a); 3–10% (b); 10–40% (c); 0.2–4% (d) and 1–10% (e).

Although any commercial roofing asphalt can be employed as the bitumen component (a) in the present composition, excellent results are achieved with asphalts having a softening point of between 80 and 150° F. and from about 120–220 decimillimeters (dmm), by ASTM D5 Penetration 5 sec./100 g total weight. A particularly useful asphalt is found to be Lagoven Flux (180–200 dmm penetration) obtained from Trumbull Co. in Kearny, N.J.

The mat on which the coating composition is applied can be composed of glass and/or organic synthetic fibers including nylon, orlon, polyester fibers and the like.

The inorganic filler suitably employed in the present composition includes any of the commercially standard types, such as calcium carbonate, limestone, talc, sand, clay, stone dust, etc.

Amorphous $C_2$ to $C_3$ olefin polymers, as well as isotactic $C_2$ to $C_3$ olefin polymers and ethylene/$C_4$ and higher alkene copolymers are discussed in U.S. Pat. Nos. 5,397,843 and 5,482,982 which disclosures are incorporated herein as describing suitable components (b), (c) and (e) for use in the present composition. Isotactic poly(propylene) and amorphous propylene copolymers are most preferred as components (b) and (c). These polymers are commercially available as amorphous poly(propylene) REXTAC® 3280, supplied by Hunstman; amorphous propylene/ethylene copolymer, e.g. EASTOFLEX® E1060, D192 and D183, supplied by Eastman Chemical Co. and REXTAC® 3585, supplied by Huntsman; isotactic poly(propylene), supplied by Sundance Co., Matrixx and Delcor Co.

It is now discovered and is indeed surprising that, to overcome the relatively poor compatibility between the asphalt and polymer components in previous formulations, only a small amount of the functionalized olefin polymer is needed and also that the addition of the functionalized component provides further benefits such as reduced asphalt and polymer exudates, an undiminished coating strength using a significantly smaller olefin to asphalt ratio and provides a flexible coating which imparts flexibility to the coated mat.

The coated mat, comprising the membrane of this invention, is marketed in rolls directly suitable for installation on either flat or pitched roofs. While the present single ply mats are preferred, multiple plied substrates are contemplated as being within the scope of this invention. Accordingly, the roofing may contain up to 6 ply layers, e.g. layers of atactic polyolefins, butadiene and styrene polymers and other multiple ply membranes used for built up roofing (BUR) and other commercial roofing or siding materials.

The present coating compositions can be economically produced by intimately mixing solid particles of the isotactic component (b) with an asphalt melt or flux maintained at a temperature of between about 275° and about 450° F., more desirably 350°–390° F., and agitating the resulting mixture until the solids are dissolved. Then adding the remaining components (c), (d) and optionally (e) and/or (f). The resulting hot composition is then coated on one surface, or preferably both the top and bottom surfaces, of the mat and allowed to cool. The resulting product is flexible and can be packaged in rolls for shipment.

Having generally described the invention, reference is now had to the following examples which illustrate the best mode of the invention but which are not to be construed as limiting to the scope thereof as set forth in the accompanying claims.

EXAMPLE 1 (COMPARATIVE)

Mat coating compositions A, B and C described below in Table 1 were prepared by heating asphalt (LAGOVEN, supplied by Trumbull Co.) to flux temperature (about 375° F.) and adding pellets of isotactic polypropylene, i.e. IPP (namely Sundance 87 MF under constant agitation until the pellets were dissolved and uniformly dispersed in the asphalt (a period of about 1 hour). The remaining components, namely non-functionalized ethylene/butene copolymer, atactic polypropylene (APP) and optionally filler (CaCO$_3$) were then added at a reduced temperature (about 365° F.) under constant agitation. The compositions were then separately hot coated in a thickness of about 2 mm on each of the top and bottom surfaces of a polyester mat. All coatings exhibited staining due to exudates and poor asphalt to polymer compatibility.

It will become apparent to those skilled in the art that many modifications and substitutions can be made in the above examples without departing from the scope of the invention as described herein. It will be understood that, in addition to the foregoing disclosure, the present mat coating composition may contain minor amounts of extraneous chemicals, e.g. an antioxidant, a thermostabilizer, a plasticizer, a flame retardant, wax or other excipient conventionally incorporated in a roofing or siding coating composition. These additives do not exceed 40% of the total coating composition. It will also become apparent that other substrate surfaces can be coated with the present composition and that other functional moieties, as well as other polymers within the foregoing teaching can be substituted in the above examples to provide similar benefit.

TABLE 1

CONVENTIONAL COATING COMPOSITIONS

| Components | A Wt. % | B Wt. % | C Wt. % |
|---|---|---|---|
| Asphalt | 77.3 | 58.0 | 54.0 |
| IPP | 6.0 | 4.75 | 4.5 |
| Ethylene/butene Copolymer (non-functionalized) | 2.7 | 1.75 | 0.0 |
| APP (amorph. Polypropylene) | 14.0 | 10.5 | 16.5 |
| Filler | 0.0 | 25.0 | 25.0 |

EXAMPLE 2

The following coating compositions (a control composition D and the composition of this invention E a maleic an hydride functionalized polypropylene was additionally incorporated after dissolution of the pellets. These compositions are described in following Table 2.

TABLE 2

| Components | Coating D Wt. % | Coating E Wt. % |
|---|---|---|
| Asphalt (AC-5) | 54.3 | 58.0 |
| IPP (isotactic poly(propylene) | 4.3 | 4.5 |
| Eastoflex D183 APAO | 16.4 | 10.5 |
| LOTADER 9042 | 0 | 1.75 |
| Crompton Polybond 3000 | 0 | 0.25 |
| Limestone | 25 | 25 |
| POLYMER/ASPHALT Weight Ratio | 20.7:1 | 17:1 |

The above coatings D and E were placed in an oven at 248° F. for 19 hours and examined for exudates emission. Coating D showed significant emission while in coating E the emission was only very slight.

The coatings D and E were coated onto a polyester mat, coated with white granules and then compared for staining using a Macbeth colorimeter (Macbeth Stain Test before and after aging 19 hours at 248° F.). The results are reported in Table 3. The L Reading measures the amount of unstaining*, i.e. the whiteness of the ceramic granules, therefore the higher L value after aging indicates a lower degree of staining.

* The staining determination was carried out using the CIELAB Test (white value) wherein an L change of 0.5 is detectable with the naked eye.

TABLE 3

|  | Composition D | Composition E |
|---|---|---|
| L Reading before aging | 68.91 | 68.71 |
| L Reading after aging | 65.15 | 68.66 |
| Change in L value | 3.76 | 0.05 |

EXAMPLE 3

The compositions of Example 2 were reproduced except that talc was substituted for limestone. These products, control D and novel composition E were coated on a polyester mat and stored in rolls for 7 days at 122° F. after which the talc coated surfaces were compared. Composition D showed considerable tack clearly visible yellow exudates; whereas composition E was slightly tacky and showed very little color change.

EXAMPLE 4

The following compositions, control D and the functionalized composition E, reported in following Table 4 were prepared according to the method described in Example 2 in order to illustrate the improved polymer/asphalt compatibility of the present composition using a lower polymer to asphalt ratio. The compatibility was measured by initially freezing and then cracking the samples. Cross section dispersions of the samples were then examined using an untraviolet microscope at 100×magnification. The results are reported in following Table 4.

TABLE 4

| Components | Composition D Wt. % | Composition E Wt. % |
|---|---|---|
| Asphalt (AC-5) | 54.3 | 58.0 |
| IPP | 4.3 | 4.5 |
| Eastoflex D183 APAO | 16.4 | 10.5 |
| Dow 9042 TPO | 0 | 1.75 |
| Crompton Polybond 3000 | 0 | 0.25 |
| Limestone | 25 | 25 |
| Ultraviolet Dispersion, on a scale of 1 (best) to 5 (worst) | 3 | 1 |
| Polymer/asphalt ratio | 27.6:1 | 22.6:1 |

The preparation of compositions D and E were repeated and asphalt/polymer compatibility tested. In this example, the compositions were placed in separate metal cans and heated in an oven at 340° F. The compositions were held for 7 days and allowed to cool to room temperature. The resulting solid samples were each subjected to ASTM D-5 Penetration test wherein ½ inch top and bottom portions of the compositions were examined. The results of these tests are reported in following Table 5

TABLE 5

| | Composition D | Composition E |
|---|---|---|
| Penetration at top of the can (dmm) | 43 | 33 |
| Penetration at bottom of the can (dmm) | 6 | 17.5 |
| Penetration change, top vs bottom (dmm) | 37 | 15.5 |
| % Change top vs bottom can storage | 86.0 | 47.0 |

As indicated by the enhanced penetration, the functionalized composition has a significantly improved asphalt/polymer compatibility.

EXAMPLE 6

The response to UV exposure by compositions D and E were also tested. It was found that Composition E had a two-fold improvement over composition D.

EXAMPLE 7

The following compositions F–K were prepared according to the method described in Example 2. These compositions were examined for asphalt/polymer compatibility using various functionalized polymers and were compared with control sample F. The compositions and compatibility characteristics are reported in following Table 6.

TABLE 6

| Sample Components | (control) F | G | H | I | J | K |
|---|---|---|---|---|---|---|
| AC-5 Asphalt | 54.3 | 55.7 | 55.7 | 55.7 | 55.7 | 55.7 |
| Eastoflex D 183 | 16.4 | 15 | 15 | 15 | 15 | 15 |
| IPP | 4.3 | 3.55 | 3.55 | 3.55 | 3.55 | 3.55 |
| Epolene G3003 | 0 | 0.75 | 0 | 0 | 0 | 0 |
| Epolene G 3015 | 0 | 0 | 0.75 | 0 | 0 | 0 |
| Polybond 3000 | 0 | 0 | 0 | 0.75 | 0 | 0 |
| Flexomer 1373 | 0 | 0 | 0 | 0 | 0.75 | 0 |
| Fusabond 353D | 0 | 0 | 0 | 0 | 0 | 0.75 |
| Limestone | 25 | 25 | 25 | 25 | 25 | 25 |
| Asphalt/polymer Ratio | 21.08 | 19.65 | 19.65 | 19.65 | 19.65 | 19.65 |
| Viscosity at 374° F. (cps) | 2,400 | 2,185 | 1,885 | 2,210 | 2,534 | 2,175 |
| Penetration | | | | | | |
| at 77° F. (dmm) | 21 | 19 | 20 | 20 | 23 | 20 |
| at 140° F. (dmm) | 77 | 75 | 74 | 74 | 80 | 73 |
| Polymer/asphalt Compatibility | 3 | 1 | 1 | 1 | 1 | 1 |

What is claimed is:
1. A roofing or siding membrane comprising a non-woven mat on which is coated a composition containing, by weight:
(a) between about 35 and about 85% asphalt;
(b) between about 1 and about 15% isotactic $C_2$ to $C_3$ olefin polymer;
(c) between about 5 and about 50% amorphous $C_2$ to $C_3$ olefin polymer;
(d) between about 0.08 and about 15% of a functionalized α-olefin homo-, co- or ter-polymer selected from the group consisting of a $C_2$ to $C_3$ olefin homopolymer, a co- or ter-polymer of a $C_2$ to $C_3$ olefin monomer and a $C_4$ to $C_{10}$ olefin comonomer and a mixture of said functionalized α-olefins;

(e) 1–10% of a non-functionalized ethylene and/or propylene polymer with a $C_4$ to $C_{12}$ α-olefin comonomer and (f) 0 to about 50% of a filler.

2. The membrane of claim 1 wherein said filler is an inorganic filler.

3. The membrane of claim 1 wherein component (b) is an isotactic poly(propylene), an isotactic poly(ethylene) or a mixture thereof.

4. The membrane of claim 3 wherein component (b) is isotactic poly(propylene).

5. The membrane of claim 1 wherein component (e) is selected from the group consisting of an ethylene/butene, ethylene/hexene, ethylene/octene, ethylene/propylene copolymers and mixtures thereof.

6. The membrane of claim 1 wherein said mat is a polyester mat.

7. The membrane of claim 1 wherein component (c) is amorphous ethylene/propylene copolymer.

8. The membrane of claim 1 wherein said mat is surfaced with a coating of between about 0.1 and about 9 mm thickness.

9. The membrane of claim 1 wherein component (d) is functionalized with a group selected from the group consisting of amino, amido, hydroxy, carboxyl, anhydride, aldehyde, epoxy, peroxy, ester and mixtures thereof.

10. The membrane of claim 9 wherein the functionalizing group is maleic anhydride.

11. The membrane of one of claims 1, 3, 7 or 9 wherein the filled composition contains, by weight, 45–65% (a); 3–3.5% (b); 8–20% (c); 0.1–2% (d); 1–5% (e) and 5–40% (f).

12. The membrane of one of claims 1, 3, 7 or 9 wherein the non-filled composition contains, by weight, 50–85% (a); 3–10% (b); 10–40% (c); 0.2–4% (d); and 1–10% (e) and (f) is 0%.

13. The asphalt coating composition of one of claims 1 or 12.

* * * * *